United States Patent
Blanton

(10) Patent No.: US 7,801,126 B2
(45) Date of Patent: Sep. 21, 2010

(54) METHOD AND SYSTEM FOR ENCODING PACKET INTERDEPENDENCY IN A PACKET DATA TRANSMISSION SYSTEM

(75) Inventor: John Blanton, Dallas, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1143 days.

(21) Appl. No.: 11/182,234

(22) Filed: Jul. 15, 2005

(65) Prior Publication Data

US 2007/0036129 A1    Feb. 15, 2007

(51) Int. Cl.
*H04L 12/56* (2006.01)
(52) U.S. Cl. .................. 370/389; 370/392; 370/394
(58) Field of Classification Search .......... 370/393.473, 370/476, 235, 236, 252, 237, 386, 389, 395, 370/471, 486, 465, 349, 392, 394, 464, 390, 370/474, 351–356
See application file for complete search history.

(56) References Cited

U.S. PATENT DOCUMENTS

| | | | |
|---|---|---|---|
| 5,610,904 A * | 3/1997 | Eng et al. ................... 370/408 |
| 5,774,593 A | 6/1998 | Zick et al. |
| 5,793,895 A * | 8/1998 | Chang et al. ................ 382/236 |
| 6,205,140 B1 * | 3/2001 | Putzolu et al. .............. 370/389 |
| 6,680,976 B1 * | 1/2004 | Chen et al. ............. 375/240.26 |
| 2003/0086495 A1 | 5/2003 | Cheung |

FOREIGN PATENT DOCUMENTS

EP    1 137 226 A2    9/2001

\* cited by examiner

*Primary Examiner*—Curtis Kuntz
*Assistant Examiner*—Mohammad K Islam
(74) *Attorney, Agent, or Firm*—RG & Associates LLC

(57) ABSTRACT

Method and system for encoding packet interdependency in a packet data stream. In one embodiment, the scheme comprises providing, for each packet in the packet data stream, a dependency relationship field associated therewith; and representing dependency of a first packet on a second packet of the packet data stream by a binary code in the dependency relationship field of the first packet, the binary code for describing the dependency as a subset relationship between the first and second packets.

13 Claims, 7 Drawing Sheets

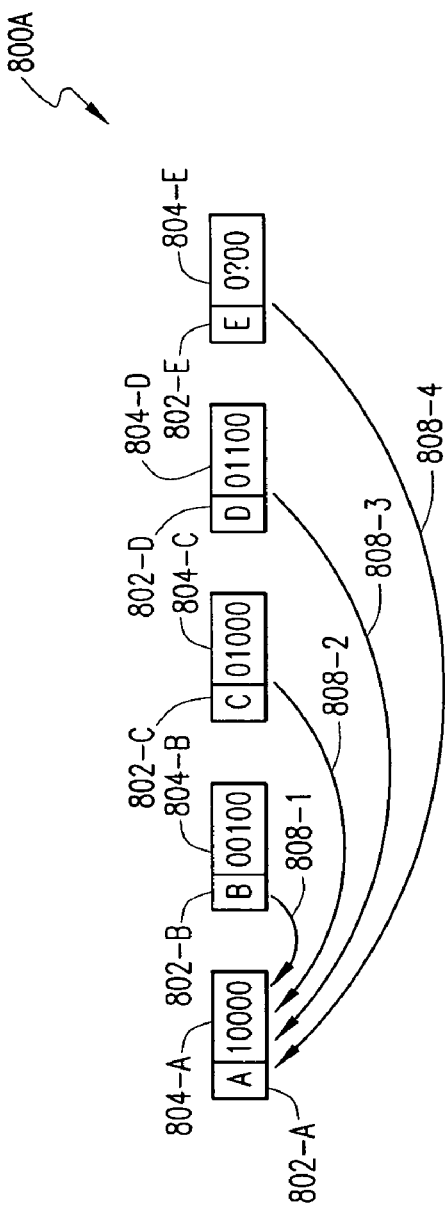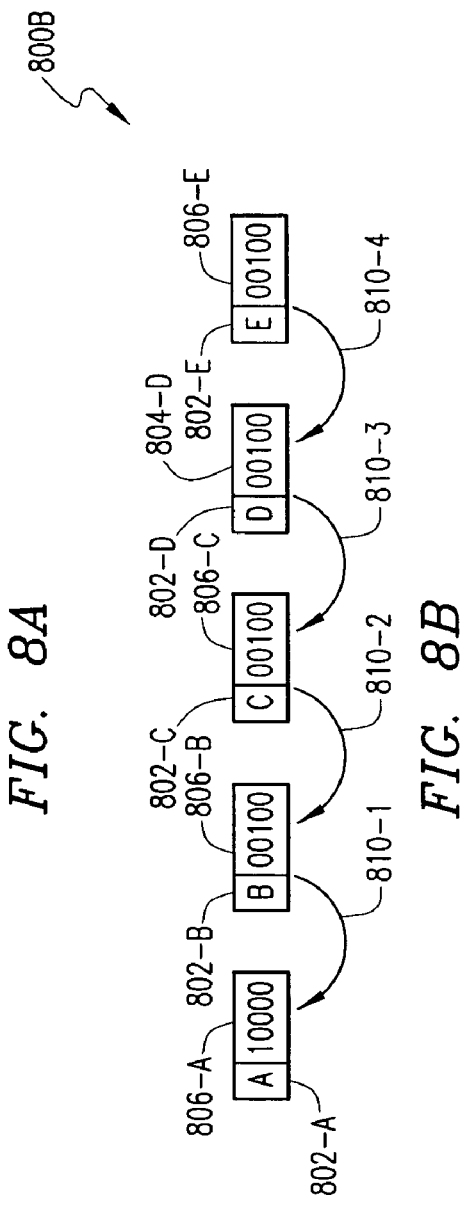
FIG. 8A
FIG. 8B

US 7,801,126 B2

METHOD AND SYSTEM FOR ENCODING PACKET INTERDEPENDENCY IN A PACKET DATA TRANSMISSION SYSTEM

STATEMENT REGARDING FEDERALLY SPONSORED RESEARCH OR DEVELOPMENT

This invention was made under the support of the United States Government, Department of Commerce, National Institute of Standards and Technology (NIST), Award Number 70NANB3H3053. The United States Government has certain rights in the invention.

BACKGROUND OF THE INVENTION

1. Technical Field of the Invention

The present invention generally relates to packet data transmission. More particularly, and not by way of any limitation, the present invention is directed to a method and system for encoding packet interdependency in a packet data transmission system.

2. Description of Related Art

In some packet data transmission systems, packets carrying data exhibit interdependency, e.g., packets relating to compressed video sequences, where some packets of the data stream have payloads that depend on the contents of other packets in a sequence. While allowing such interdependency is useful in bandwidth management, it does give rise to certain issues that must be addressed. For instance, if it is necessary to drop packets at a point in the transmission system (due to congestion, as an example), it becomes important to have some knowledge of the packet interdependency so that packets on which other packets depend are not preferred for dropping.

SUMMARY OF THE INVENTION

In one aspect, a scheme is disclosed for encoding packet interdependency in a packet data stream using a compact encoding mechanism. In one embodiment, the scheme comprises providing, for each packet in the packet data stream, a dependency relationship field (DRF) associated therewith; and representing dependency of a first packet on a second packet of the packet data stream by a binary code in the dependency relationship field of the first packet, the binary code for describing the dependency as a subset relationship between the first and second packets.

In another embodiment, the scheme comprises providing, for each packet in the packet data stream, a relative displacement pointer (RDP) field associated therewith, the RDP field including a first direction dependency subfield and a second direction dependency subfield; and representing dependency of a particular packet of the packet data stream by a first binary code in the first direction dependency subfield and a second binary code in the second direction dependency subfield, the first binary code for describing the particular packet's dependency on a packet disposed in one direction of the packet data stream and the second binary code for describing the particular packet's dependency on a packet disposed in an opposite direction of the packet data stream.

In a further embodiment, the present invention is directed to a system for encoding packet interdependency in a packet data stream, comprising: means for providing, for each packet in the packet data stream, a DRF portion associated therewith; and means for representing dependency of a first packet on a second packet of the packet data stream by a binary code in the dependency relationship field of the first packet, the binary code for describing the dependency as a subset relationship between the first and second packets.

In a still further embodiment, the present invention is directed to a system for encoding packet interdependency in a packet data stream, comprising: means for providing, for each packet in the packet data stream, an RDP field associated therewith, the RDP field including a first direction dependency subfield and a second direction dependency subfield; and means for representing dependency of a particular packet of the packet data stream by a first binary code in the first direction dependency subfield and a second binary code in the second direction dependency subfield, the first binary code for describing the particular packet's dependency on a packet disposed in one direction of the packet data stream and the second binary code for describing the particular packet's dependency on a packet disposed in an opposite direction of the packet data stream.

In another aspect, a packet data transmission system for transmitting a packet data stream is disclosed. In one embodiment, the packet data transmission system comprises: a packet data transmitter operable to multiplex data from a plurality of video sources into the packet data stream; an encoder for representing dependency of a first packet on a second packet of the packet data stream by a binary code in a dependency relationship field of the first packet, the binary code for describing the dependency as a subset relationship between the first and second packets; and a packet data receiver including a decoder for receiving the packet data stream, the decoder for decoding dependency of packets in the packet data stream.

In another embodiment, the packet data transmission system of the present invention comprises: a packet data transmitter operable to multiplex data from a plurality of video sources into the packet data stream; an encoder for representing dependency of a particular packet of the packet data stream by a first binary code in the first direction dependency subfield and a second binary code in the second direction dependency subfield, the first binary code for describing the particular packet's dependency on a packet disposed in one direction of the packet data stream and the second binary code for describing the particular packet's dependency on a packet disposed in an opposite direction of the packet data stream; and a packet data receiver including a decoder for receiving the packet data stream, the decoder for decoding dependency of packets in the packet data stream.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

FIGS. 8A and 8B depict an illustration of the transitive property of the packet interdependency relationship.

DETAILED DESCRIPTION OF THE DRAWINGS

Figure 1:
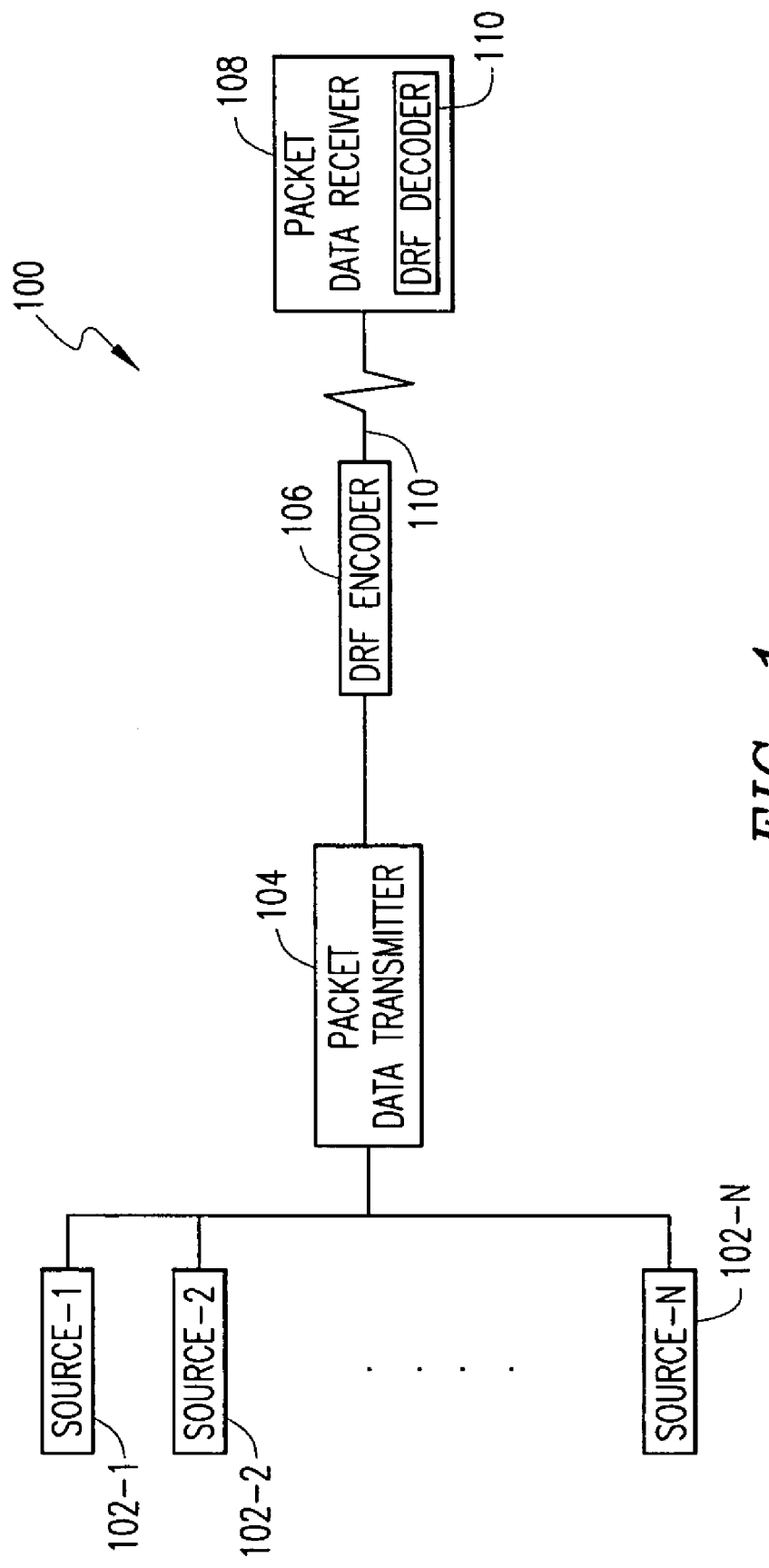
FIG. 1 depicts an exemplary packet data transmission system wherein an embodiment of the present invention may be practiced.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary packet data transmission system 100 wherein an embodiment of the present invention may be practiced for purposes of encoding inter-packet dependency relationships that may exist between data packets. By way of illustration, the packet data transmission system 100 may comprise any generalized transmission system that involves generation, transmission and reception of packetized data wherein packet interdependency exists. For instance, as alluded to in the Background section of the present patent disclosure, packets carrying data relating to compressed video sequences have a dependency relationship because some packets contain data that depend on the contents of other packets in a sequence. Accordingly, the packet data transmission system 100 may comprise a compressed video transmission system in one exemplary embodiment, although it will be apparent that the teachings of the present invention may be practiced in other packet data transmission systems as well.

As illustrated, the packet data transmission system 100 includes a plurality of data sources, e.g., Source-1 102-1 through Source-N 102-N, that generate data packets for transmission. A packet data transmitter 104 is operable to multiplex the packet data from the N independent sources so that the merged data can be transported on a single, shared link 110 for reception by a packet data receiver 108. An encoder 106 associated with the packet data transmitter 104 is operable to provide an inter-packet dependency relationship encoding mechanism wherein each packet is provided with a dependency relationship field (DRF) as will be set forth in detail hereinbelow. Those skilled in the art will recognize that although the encoder 106 is shown as a separate block in FIG. 1, it may be integrated within the packet data transmitter 104. Furthermore, the encoder may be disposed further upstream in the transmission system 100 such that the independent streams of data from each data source is encoded appropriately before it is multiplexed for transmission. Regardless of how encoding is effectuated at the source side of the packet data transmission system 100, a decoder 110 is associated with the packet data receiver 108 that is operable to decode the encoded packet data so as to determine appropriate inter-packet dependencies of the received packets.

Figure 2:
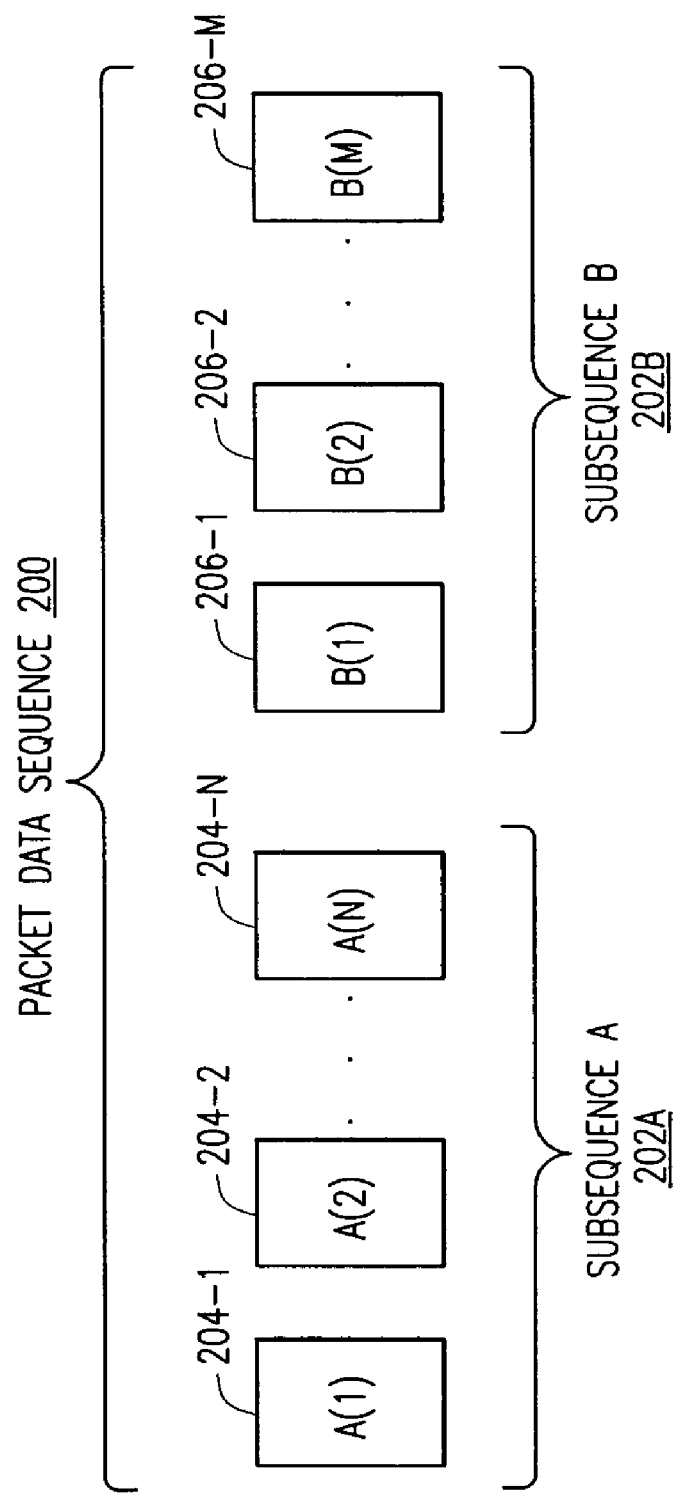
FIG. 2 depicts an exemplary packet data sequence operable in the packet data transmission system of FIG. 1.

FIG. 2 depicts an exemplary packet data sequence 200 operable in the packet data transmission system 100 of FIG. 1, wherein packet interdependent relationships may arise. By way of example, the packet data sequence 200, which may be generated by the packet data transmitter 104, is shown to comprise two subsequences, Subsequence A 202A and Subsequence B 202B. Each subsequence in turn includes a plurality of packets that may show some degree of interdependency, although packets in one subsequence are typically not dependent on the packets from another subsequence. Subsequence A 202A is illustrated with N packets, A(1) 204-1 through A(N) 204-N, whereas Subsequence B 202B includes M packets, B(1) 206-1 through B(M) 206-M. Alternatively, some subsequences may have the same number of packets in a data stream.

Figure 3:
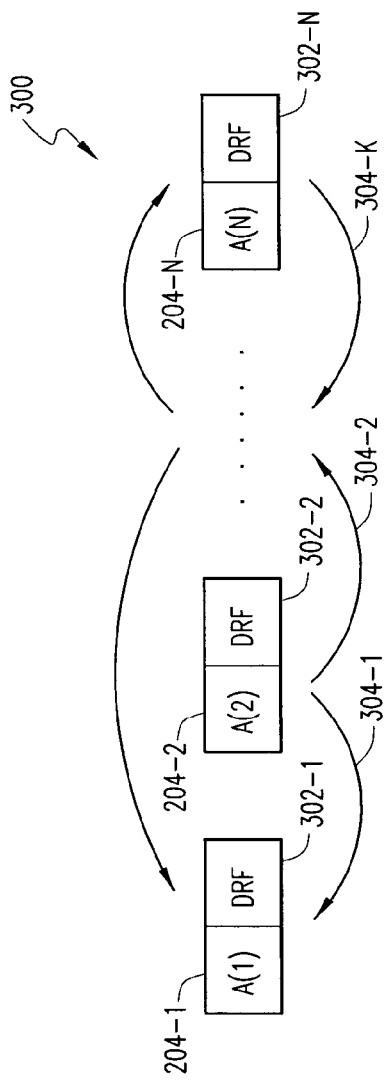
FIG. 3 depicts an embodiment of a packet interdependency encoding scheme in accordance with the teachings of the present invention.

FIG. 3 depicts an embodiment of a packet interdependency encoding scheme 300 in accordance with the teachings of the present invention. By way of example, Subsequence A involving N packets is illustrated as a packet data stream wherein each packet is provided with a DRF of arbitrary size (i.e., a binary field of any size) associated therewith. The starting packet of the data stream, A(1) 204-1, is provided with a DRF 302-1, the next packet, A(2) 204-1, is provided with a DRF 302-2, and so on, for the entire packet data stream. A number of interdependency relationships among the N data packets exist such that the contents of at least one packet of the data stream depends on the contents of another packet therein. In accordance with the teachings of the present invention, dependency of a first packet in the data stream on a second packet therein is represented by a binary code in the DRF associated with the first packet such that the binary code is encoded with a set theory formulation for describing the dependency as a subset relationship between the first and second packets. Accordingly, as many subset relationships are created by the DRF encoding mechanism as there are the interdependencies among the data packets. As illustrated, K interdependent relationships are exemplified, which give rise to K subset formulations based on the binary coding of the DRFs of the packets by the DRF encoding mechanism of the present disclosure.

In terms of implementation, the DRFs may be provided within a header block of each of the data packets, which may thereby require some modification to the packet data protocol being used by the packet data transmission system. Alternatively, the DRFs may be provided within a payload portion of the data packets so long as the transmission system is capable of treating the DRFs appropriately for purposes of decoding the packet interdependencies and not as part of the data itself.

Figure 4:
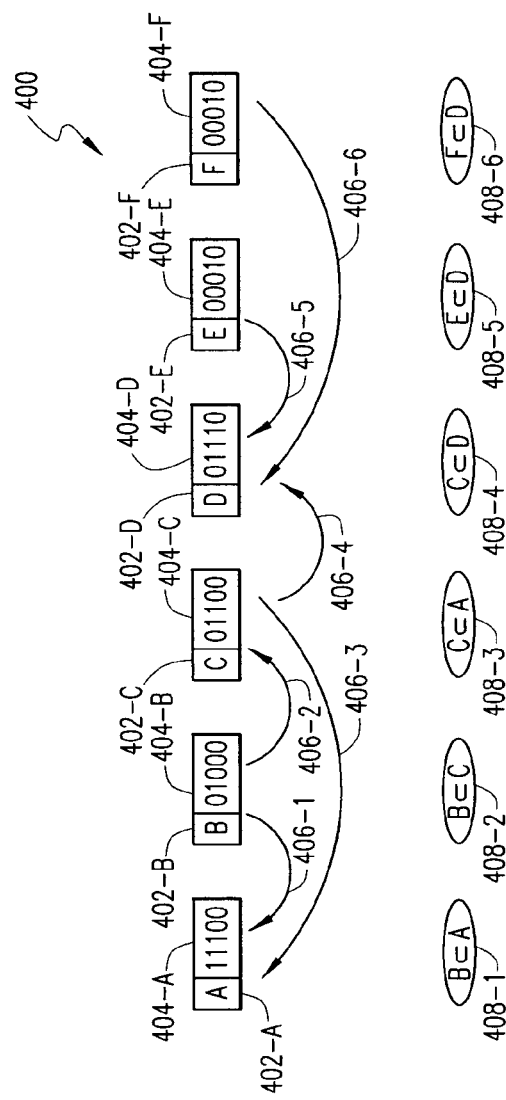
FIG. 4 depicts an illustration of the packet interdependency encoding scheme of FIG. 3.

FIG. 4 depicts an illustration of the packet interdependency encoding scheme of FIG. 3. Reference numeral 400 refers to a stream of six data packets, packet A 402-A through packet F 402-F, each having a 5-bit DRF that is appropriately encoded to describe the interdependencies in the packet data. Accordingly, reference numerals 404-A through 404-F refer to the DRFs associated with the six data packets, respectively. Further, six interdependent relationships are exemplified: packet B depends on packet A as well as on packet C; packet C in turn depends on packet A as well as on packet D; and both packet E and packet F depend on packet D. As illustrated, these six interdependent relationships are shown by respective directional arrows 406-1 through 406-6.

In one embodiment, the most significant bit (MSB) of the DRF of the starting packet may be set in order to indicate the beginning of a subsequence within which one or more interdependent relationships may exist. In other words, setting the MSB of the DRF of the starting packet allows demarcation of a group of packets which need to be encoded appropriately based on any interdependencies therein. As shown in FIG. 4, the MSB of DRF 404-A associated with packet A is set (i.e., MSB=1), thereby indicating the start of the subsequence. The MSBs of the DRFs of the remaining packets in the subsequence are all cleared (i.e., MSB=0). The subfields of each DRF (i.e., the bits after the MSB, hereinafter referred to as the "sub-DRF") are then encoded in a binary code so that when the full complement of the 5-bit DRFs are provided, they are operable to represent the interdependencies in a mathematical proper subset formulation. For example, to represent that packet B is dependent on packet A, the sub-DRF of packet B is coded as [1000], whereby its DRF becomes [01000] which is a proper subset of packet A's DRF 404-A that is coded with binary code [11100] (i.e., the sub-DRF of packet A is provided as [1100]). In set theory notation, this relationship is represented as B⊂A, that is, B is a proper subset of A. In FIG. 4, reference numeral 408-1 refers to this subset relationship. Likewise, to represent that packet B is dependent on packet C, the sub-DRF of packet C is coded as [1100], whereby its DRF becomes [01100]. Thus, the DRF of packet B remains a proper subset of the DRF of packet C, while packet C itself is dependent on packet A (since [01100] is a proper subset of [11100], the DRF of packet A). In other words, both B⊂C and C⊂A relationships are maintained by appropriately encoding the respective DRFs. These subset relationships are labeled as reference numerals 408-2 and 408-3, respectively, in FIG. 4. In similar fashion, the DRFs of the remaining packets are encoded by the encoding mechanism of the present disclosure as [01110] for packet D, [00010] for packet E, and [00010] for packet F.

It is possible that the DRFs of two packets may be the same but there is no dependency relationship between them. For example, it should be noted that since the DRFs of packet E and packet F are the same, there is no proper subset relationship. Accordingly, the set theory representation F ⊂ E (because DRF of E≡DRF of F) is in conformity with the independent relationship between the two packets.

Those skilled in the art should appreciate that the DRF encoding mechanism set forth above is operable to encode an arbitrary number of interdependency relationships in a packet data stream so long as appropriate delimiters are encoded for identifying groups of packets within which inter-packet DRF comparisons are to be restricted. In an exemplary application, it would be desirable to impose a rule that a starter packet in a subsequence (such as packet A in the above example where the MSB of the DRF is set) be also operable as a "terminator" packet such that it belongs only to the subsequence it starts. Regardless of how a sequence is delimited, it should be apparent that the DRF encoding process starts afresh for each new subsequence.

Figure 5:
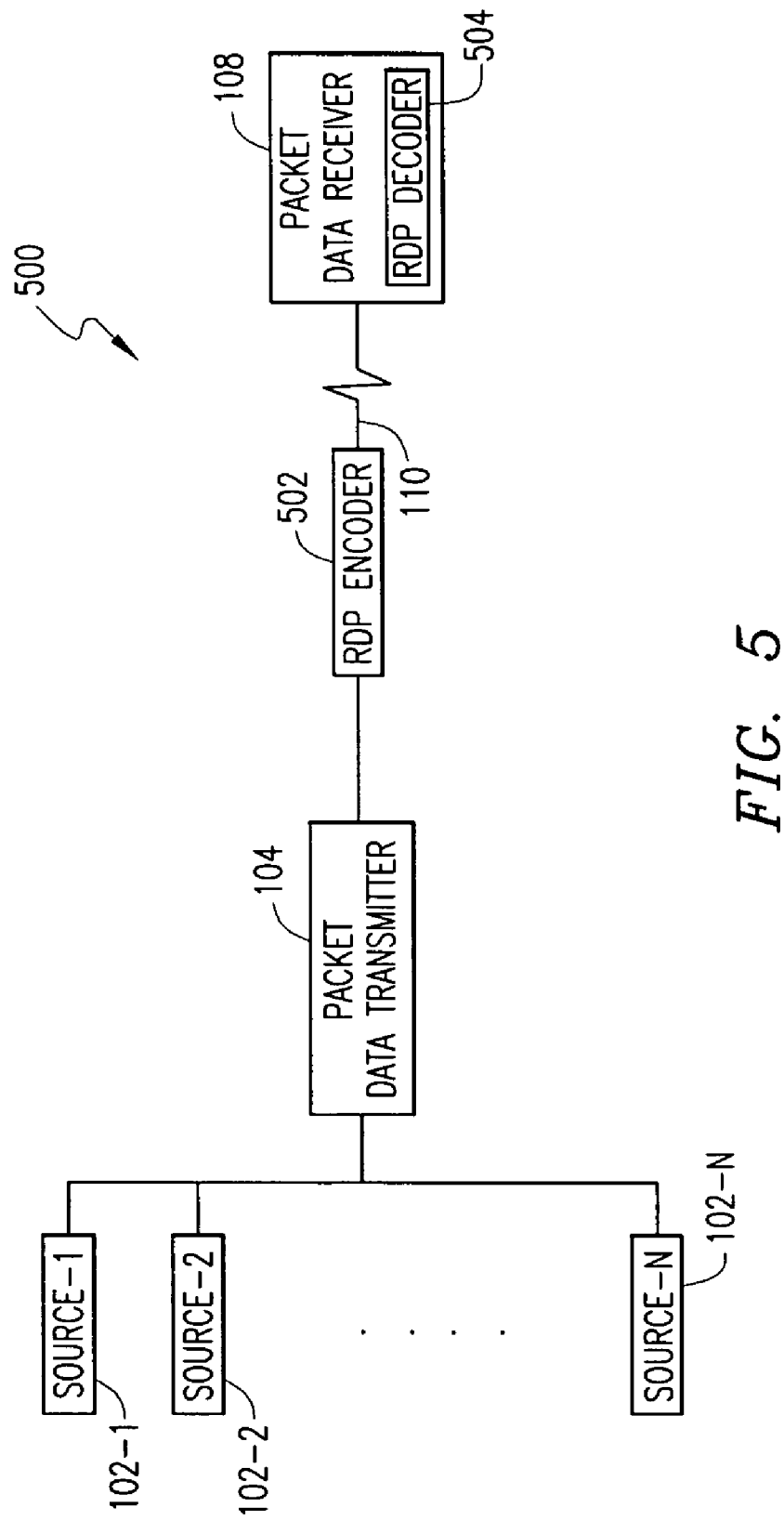
FIG. 5 depicts an exemplary packet data transmission system wherein another embodiment of the present invention may be practiced.

FIG. 5 depicts an exemplary packet data transmission system 500 wherein another embodiment of the present invention may be practiced. Similar to the packet data transmission system 100 of FIG. 1, independent sources 102-1 through 102-N provide various streams of packet data for multiplexing by the packet data transmitter 104. As will be explained below, an encoder 502 associated with the transmitter 104 and/or the independent sources is operable to provide a relative displacement pointer (RDP) field in each packet so that a dependent packet may point to other packets in a packet data stream. A suitable RDP decoder 504 associated with the packet data receiver 108 is operable to decode the encoded packet data so as to determine appropriate inter-packet dependencies of the received packets.

Figure 6:
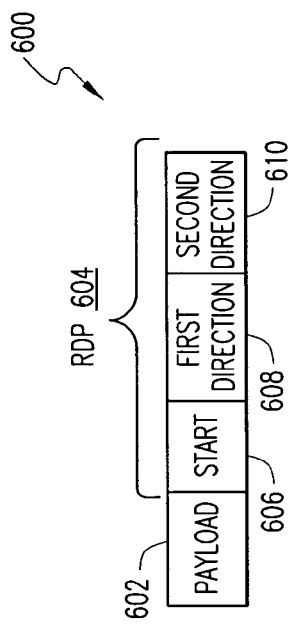
FIG. 6 depicts an embodiment of a relative displacement pointer (RDP) field for encoding packet interdependency in accordance with the teachings of the present invention.

FIG. 6 depicts an embodiment of a relative displacement pointer (RDP) field of arbitrary size for encoding packet interdependency in accordance with the teachings of the present invention. Reference numeral 600 refers to a generalized RDP-encoded packet which includes a payload block 602 and an RDP field 604. In the exemplary embodiment depicted, the RDP field 604 is shown as a field that is separate from the payload block 602, possibly placed within a header block (not explicitly shown). In other embodiments, however, the RDP field 604 may be provided elsewhere within the generalized data packet 600. Regardless of where it is placed, the RDP field 604 is comprised of a "Start" subfield 606, a first direction dependency subfield 608, and a second direction dependency subfield 610, wherein each subfield may include an appropriate number of bits. In one implementation, the RDP encoding mechanism of the present disclosure may encode the Start subfield 606 of a beginning packet with a single bit that is set (i.e., Start=1) in order to encode a group of related packets that follow the beginning packet. All other packets in the group may be coded with Start=0. The first direction dependency subfield 608 of the packet is coded with a first binary code for describing the packet's dependency on a packet disposed in one direction of the packet data stream (e.g., backward or forward with respect to the packet under consideration). Likewise, the second direction dependency subfield 610 of the packet is coded with a second binary code for describing the packet's dependency on a packet disposed in the other direction of the packet data stream (i.e., in a direction opposite to the direction identified by the first direction dependency subfield 608).

By way of implementation, essentially, the directional dependency subfields 608, 610 are coded with the binary numbers that are representative of the relative distance between a dependent packet and the packet it depends on, in either direction, thereby identifying the upstream packet as well as the downstream packet on which the dependent packet depends. It should be realized that although both first and second direction dependency subfields 608 and 610 may be provided with the same number of bits (i.e., the same size) in an exemplary implementation, there is no such limitation for purposes of the present patent application. Further, the size of the directional dependency subfields may vary depending on how large a pointer in either direction is to be implemented in a particular application given the constraints of protocol overhead, complexity, computational expense, etc.

Figure 7:
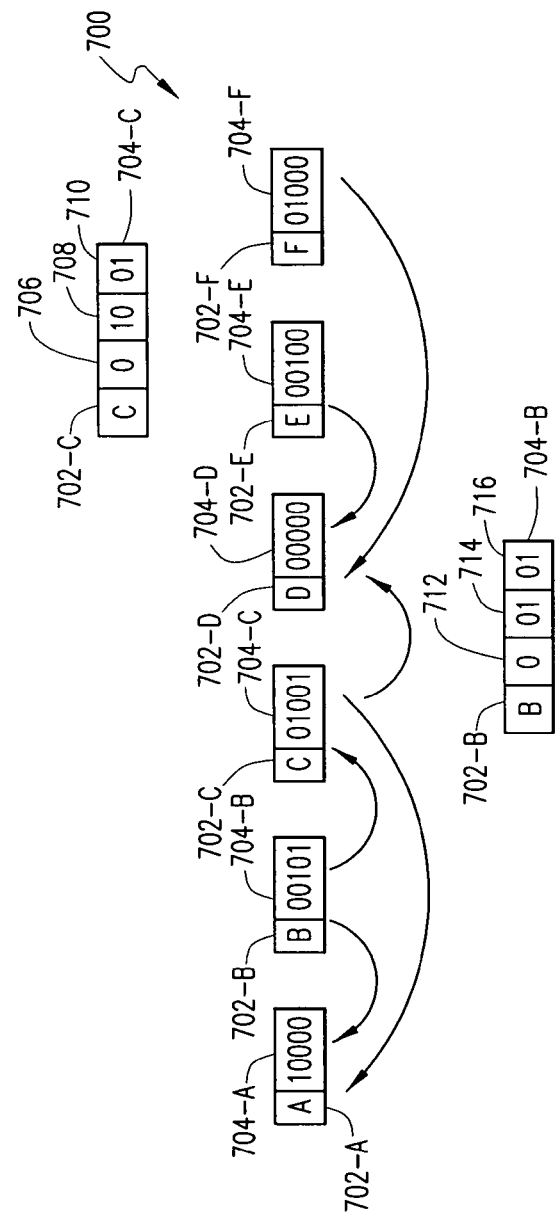
FIG. 7 depicts an illustration of the packet interdependency encoding scheme using the RDP field.

FIG. 7 depicts an illustration of the packet interdependency encoding scheme using the RDP field embodiment described above. Reference numeral 700 refers to a packet data stream including six packets, packet A 702-A through packet F 702-F, each having a 5-bit RDP field that is appropriately encoded to describe the bidirectional interdependencies in the packet data. Accordingly, reference numerals 704-A through 704-F refer to the RDP fields associated with the six data packets, respectively. Further, similar to the illustrative data stream 400 shown in FIG. 4, the same six interdependent relationships are exemplified: packet B depends on packet A as well as on packet C; packet C in turn depends on packet A as well as on packet D; and both packet E and packet F depend on packet D. Packet A 702-A has its 5-bit RDP field 704-A coded with [10000], indicating that it is the beginning packet of a subsequence (since its MSB=1). Additionally, both its first and second directional dependency subfields are [00], thereby signifying that packet A is not dependent on any other packet in either direction. Packet B 702-B has its RDP field 704-B coded with [00101]; that is, its Start subfield 712=[0], first direction dependency subfield 714=[01] and second direction dependency subfield 716=[01]. Accordingly, packet B 702-B is dependent on one packet to its left (i.e., packet A) and one packet to its right (i.e., packet C). Based on whatever convention is applied for signifying direction, these packets are upstream or downstream (or, forward or backward) from the standpoint of packet B. Likewise, packet C 702-C has its RDP field 704-C coded with [01001] such that its Start subfield 706=[0], first direction dependency subfield 708=[10] (signifying packet C's dependency on a packet that is disposed two packets from itself) and second direction dependency subfield 710=[01] (signifying packet C's dependency on a packet that is disposed one packet away). As illustrated, these packets are packets A and B, respectively. In similar fashion, the RDP encoding mechanism of the present invention provides the RDP subfields of packet D, packet E and packet F as [00000] (signifying that packet D is not dependent, nor is it a starting packet), [00100] (signifying that packet E is dependent of packet D), and [01000] (signifying that packet F is dependent on packet D), respectively.

It should be noted that in the exemplary RDP field encoding scheme set forth above, only five bits are used, which limits a directional displacement pointer to point to at most three packets in each direction ([00]=no dependency; [01]=one packet away; [10]=two packets away; and [11]=three packets away). This range can be exceeded by making use of the transitive property of the dependency relationship as illustrated in FIGS. 8A and 8B. In FIG. 8A, reference numeral 800A refers to a five-packet subsequence, packet A 802-A through packet E 802-E, each having a 5-bit RDP field 804-A through 804-E. Four dependency relationships 808-1 through 808-4 are illustrated: each of packets B, C, D and E depends only on packet A. Whereas the 5-bit RDP fields 804-B through 804-D are adequate to describe the dependencies of packets B, C and D (on packet A), the dependency of packet E on packet A cannot be described using this pointer because the relative displacement exceeds 3. In FIG. 8B, the coding makes use of the transitive property of the dependencies, wherein reference numeral 800B refers to the five-packet subsequence with packet interdependencies being resolved such that a dependent packet depends on a packet that is at most only one packet away. Using the transitive property to represent that packet E ultimately depends on packet A because it depends of packet D, which in turn depends on packet C, which depends on packet B, which in turn depends on packet A, a new set of dependencies 810-1 through 810-4 are obtained. Likewise, the 3-packet-long dependency of packet D on packet A can be broken into a number of 1-packet-long dependencies (through packets C, B and ultimately A). In other words, the "long distance" parallel dependencies are resolved into a number of "short distance" serial dependencies by using the transitive property of the relationships. Since each of these dependencies describe displacements of only one packet, the 5-bit RDP fields 806-A through 806-E of the packets can be coded appropriately to represent these dependency relationships.

Figure 9A:
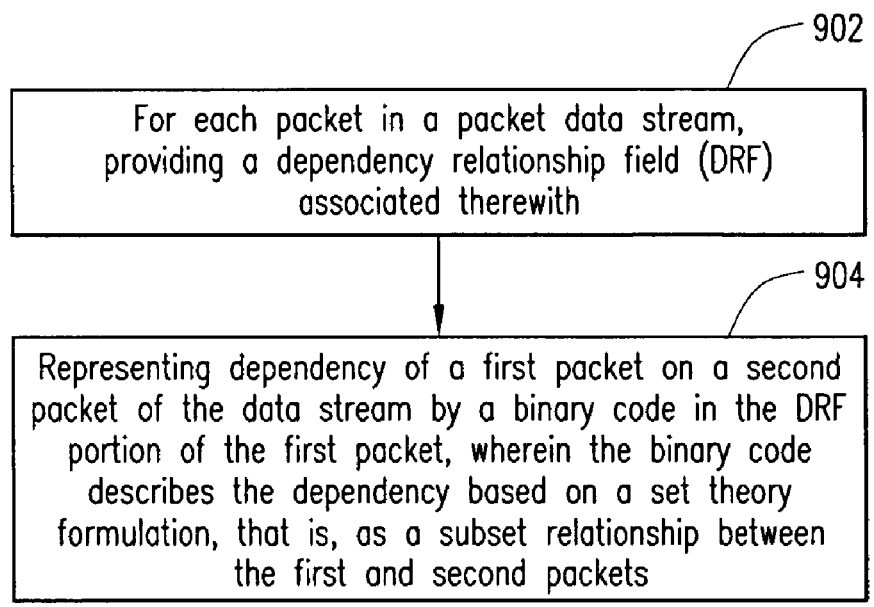
FIGS. 9A and 9B are flowcharts associated with the embodiments of the present invention.
Figure 9B:
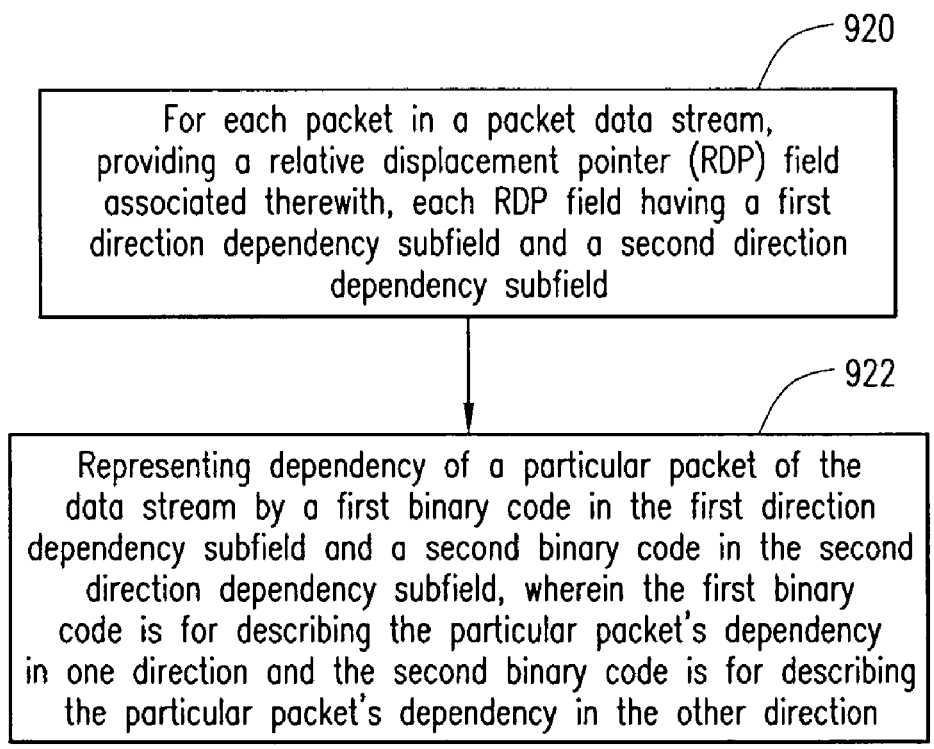

Referring now to FIGS. 9A and 9B, shown therein are two flowcharts associated with the embodiments of the present invention. In FIG. 9A, the flowchart describes the operations involved in a DRF encoding scheme for describing the interdependency in a packet data stream. For each packet in the packet data stream, a DRF portion is provided by an encoder disposed in a packet data transmission system (block 902). As alluded to in the foregoing description, the DRF portion may occupy a portion of the packet headers or be disposed within the payload of the packets. The encoder is operable to represent dependency of a first packet on a second packet of the data stream (e.g., a subsequence or a group of related packets) by a binary code in the DRF portion, wherein the binary code describes the dependency based on a set theory formulation, i.e., as a subset relationship between the first and second packets (block 904).

In FIG. 9B, the flowchart describes the operations involved in an RDP field encoding scheme for describing the interdependency in a packet data stream. For each packet in the packet data stream, an RDP field is provided by an encoder disposed in a packet data transmission system, wherein the RDP field is comprised of a first direction dependency subfield and a second direction dependency subfield (block 920). As explained elsewhere in the present disclosure, the RDP field may occupy a portion of the packet headers or be disposed within the payload of the packets. The encoder is operable to represent dependency of a particular packet of the data stream (e.g., a subsequence or a group of related packets) by a first binary code in the first direction dependency subfield and a second binary code in the second direction dependency subfield, wherein the first binary code is for describing the particular packet's dependency on a packet disposed in one direction of the data stream and the second binary code is for describing the particular packet's dependency on a packet disposed in an opposite direction of the data stream (block 922).

Based on the foregoing Detailed Description, it should be appreciated that the exemplary embodiments of the present invention advantageously provide a compact signaling mechanism for describing packet interdependencies in a packet data transmission system. Accordingly, the embodiments described herein provide a data stream traffic manager disposed in the packet data transmission system the requisite information that allows it to manage and possibly avoid unnecessary packet data loss (due to a congestion management policy, for example) in an intelligent manner. In particular, if it is necessary to drop one of two packets to resolve congestion and if one of the packets depends on the other, then the manager can drop the dependent packet, since dropping the independent packet would render the dependent packet unusable. Further, the compact aspect of the embodiments set forth herein allows packet interdependency information to be signaled to the traffic manager without the use of additional "out-of-band" signaling packets, thereby minimizing protocol overhead, computational complexity, et cetera.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A method of encoding packet interdependency in a packet data stream, comprising:

generating, via a plurality of data sources, a packet data stream through a video packet data transmitter, wherein the packet data stream comprises a plurality of data packets, each data packet carrying video data as payload;

for each packet in said packet data stream, providing a relative displacement pointer (RDP) field associated therewith, said RDP field including a first direction dependency subfield and a second direction dependency subfield;

representing dependency of a particular packet of said packet data stream by a first binary code in said first direction dependency subfield and a second binary code in said second direction dependency subfield, said first binary code for describing said particular packet's dependency on a packet disposed in one direction of said packet data stream and said second binary code for describing said particular packet's dependency on a packet disposed in an opposite direction of said packet data stream; and receiving said packet data stream by binary code for describing said particular packet's dependency on a packet disposed in one direction of said packet data stream and said second binary code for describing said particular packet's dependency on a packet disposed in an opposite direction of said packet data stream in a packet data receiver communicably coupled to the video packet data transmitter.

2. The method of encoding packet interdependency in a packet data stream as recited in claim 1, wherein said RDP field is provided within a header block of said particular packet.

3. The method of encoding packet interdependency in a packet data stream as recited in claim 1, wherein said RDP field is provided within a payload block of said particular packet.

4. The method of encoding packet interdependency in a packet data stream as recited in claim 1, wherein said RDP field is encoded by an encoder coupled to a video packet data transmitter.

5. The method of encoding packet interdependency in a packet data stream as recited in claim 4, wherein said video packet data transmitter functions to multiplex data from a plurality of video sources.

6. A system for encoding packet interdependency in a packet data stream, comprising:

means for providing a relative displacement pointer (RDP) field associated with each packet in said packet data stream, wherein each data packet carries video data as payload, said RDP field including a first direction dependency subfield and a second direction dependency subfield; and means for representing dependency of a particular packet of said packet data stream by a first binary code in said first direction dependency subfield and a second binary code in said second direction dependency subfield, said first binary code for describing said particular packet's dependency on a packet disposed in one direction of said packet data stream and said second binary code for describing said particular packet's dependency on a packet disposed in an opposite direction of said packet data stream.

7. The system for encoding packet interdependency in a packet data stream as recited in claim 6, wherein said RDP field is provided within a header block of said first packet.

8. The system for encoding packet interdependency in a packet data stream as recited in claim 6, wherein said RDP field is provided within a payload block of said first packet.

9. The system for encoding packet interdependency in a packet data stream as recited in claim 6, wherein said RDP field is encoded by an encoder coupled to a video packet data transmitter.

10. The system for encoding packet interdependency in a packet data stream as recited in claim 9, wherein said video packet data transmitter functions to multiplex data from a plurality of video sources.

11. A packet data transmission system for transmitting a packet data stream, comprising:

a packet data transmitter operable to multiplex data from a plurality of video sources into said packet data stream, wherein the packet data stream comprises a plurality of data packets, each data packet carrying video data as payload;

an encoder for representing dependency of a particular packet of said packet data stream by a first binary code in said first direction dependency subfield and a second binary code in said second direction dependency subfield, said first binary code for describing said particular packet's dependency on a packet disposed in one direction of said packet data stream and said second binary code for describing said particular packet's dependency on a packet disposed in an opposite direction of said packet data stream; and a packet data receiver including a decoder for receiving said packet data stream, said decoder for decoding dependency of packets in said packet data stream.

12. The packet data transmission system for transmitting a packet data stream as recited in claim 11, wherein said RDP field is provided within a header block of said particular packet.

13. The packet data transmission system for transmitting a packet data stream as recited in claim 11, wherein said RDP field is provided within a payload block of said particular packet.

* * * * *